United States Patent
Brunswig et al.

(10) Patent No.: US 8,060,863 B2
(45) Date of Patent: Nov. 15, 2011

(54) CONFORMANCE CONTROL MODULE

(75) Inventors: Frank Brunswig, Heidelberg (DE); Martin Hartig, Speyer (DE); Johannes Viegener, Karlsruhe (DE)

(73) Assignee: SAP AG, Walldorf (DE)

( * ) Notice: Subject to any disclaimer, the term of this patent is extended or adjusted under 35 U.S.C. 154(b) by 1366 days.

(21) Appl. No.: 11/436,614

(22) Filed: May 19, 2006

(65) Prior Publication Data

US 2007/0268822 A1 Nov. 22, 2007

(51) Int. Cl.
*G06F 9/44* (2006.01)

(52) U.S. Cl. ......... 717/124; 717/125; 717/126; 717/100

(58) Field of Classification Search ................... 717/124
See application file for complete search history.

(56) References Cited

U.S. PATENT DOCUMENTS

| | | | | |
|---|---|---|---|---|
| 6,725,399 B1 * | 4/2004 | Bowman | | 714/38 |
| 7,017,142 B1 * | 3/2006 | Ehnebuske et al. | | 717/100 |
| 7,055,137 B2 * | 5/2006 | Mathews | | 717/125 |
| 7,448,023 B2 * | 11/2008 | Chory et al. | | 717/124 |
| 2005/0066263 A1 * | 3/2005 | Baugher | | 715/500 |
| 2006/0265691 A1 * | 11/2006 | Klinger et al. | | 717/124 |

* cited by examiner

*Primary Examiner* — Thomas K Pham
(74) *Attorney, Agent, or Firm* — Mintz, Levin, Cohn, Ferris, Glovsky and Popeo, P.C.

(57) ABSTRACT

Systems, methods and computer readable media are provided for the conformance testing of services through the utilization of a conformance control module. In one exemplary embodiment, the method may include comparing meta-data returned by the service to predetermined parameters to determine whether the meta-data conforms to the predetermined parameters. The method may also include determining a conformance violation exists when the comparison indicates the meta-data does not conform to the predetermined parameters. The method may further include determining a conformance violation does not exist when the comparison indicates the meta-data does conform to the predetermined parameters. Moreover, the method may include continuing execution of the service based on the results of the comparisons made.

20 Claims, 6 Drawing Sheets

CONFORMANCE CONTROL MODULE

TECHNICAL FIELD

The present invention generally relates to the field of software testing and software testing environments. More specifically, the invention relates to methods, systems, and computer program products for testing the conformance of a service based upon requirements set forth in a service contract.

BACKGROUND INFORMATION

One of today's most pressing challenges for enterprises is the integration of their existing heterogeneous information technology (IT) landscapes. For example, a typical enterprise may comprise a wide array of individual modules or software applications, supporting different functions and business units, written in different programming languages, and running on different operating systems. The integration of these modules to the point where information may be readily shared has proved to be a daunting task. However, a fairly recent solution to this problem has emerged in the form of a Service Oriented Architecture (SOA). SOA refers to a software architectural framework that encourages the creation of loosely coupled services that communicate and pass information between the modules. An implementation example of an SOA is the Enterprise Service Architecture (ESA) developed by SAP AG of Walldorf, Germany. In particular, the ESA is implemented through NetWeaver, an integration and application platform, also developed by SAP AG. Other examples of SOA enabling platforms are NET developed by Microsoft and WebSphere developed by IBM.

Specific examples of the loosely coupled services used within an SOA are services. A service, such as a Web service, represents a self-contained, self-describing piece of application functionality that can be found and accessed by other applications. A service is self contained, because the application using the service does not have to depend on anything other than the service itself, and self-describing, because all the information on how to use the service can be obtained from the service itself. The descriptions are centrally stored and accessible through standard mechanisms to all applications that would like to invoke the service.

Because services are generally granular in nature, services may be aggregated into enterprise services, which provide more meaningful building blocks for the task of automating enterprise-scale business scenarios. Enterprise services allow IT organizations to efficiently develop composite applications, defined as applications that compose functionality and information from existing systems to support new business processes or scenarios. Enterprise services may communicate using standard mechanisms, can be described in a central repository, and are created and managed by tools provided by the application platform. The enterprise services repository may be used to store all relevant pre-existing enterprise services and to make them available to selected partners and customers. As used herein, the term "service" shall include both Web services and enterprise services.

The description of the requirements of a service may be accomplished through the use of a service contract. For example, the service contract may be implemented using the Web Services Description Language (WSDL), which enables definitions that describe how to access a service and what operations the service will perform. The service contract may also be implemented using the Enterprise Services Description Language (ESDL), which extends the WSDL by allowing the description of services that interact with business objects. A business object is a contained collection of data, business operations and rules stored within a runtime repository. For example, a business object may be an entire order processing system or a small process within an information system.

The use of service contracts is greatly beneficial in a truly open SOA environment. In such environments, where the user of the service and the service provider are loosely coupled, neither entity (i.e., the service user or the service provider) may know much about the other entity and thus, a service contract may be warranted. For example, neither implementation details of the service nor usage scenarios of the service may be known to the other party. This may occur when an enterprise is using a service developed by a third party service provider or when a business unit within the enterprise is using a service developed by another business unit. A service contract is thus helpful, in that the service contract specifies to any and all users of the service, the functional requirements of the service (e.g., the functionality the service provides and what type of data or business object it will return).

Testing the conformance of services against the functionality described in their service contracts is an important part of a software development process, as it guarantees a certain productivity and quality in software engineering. In almost all business cases, the conformance of the service in relation to its service contract is essential for the service consumers and the service infrastructure. The service provider must guarantee the appropriate support of these service contracts and constraints.

In general, a regular test application, such as the Business Object Browser available in SAP's ESA, may be sufficient for an application developer to test the runtime behavior of a service during implementation. This may be accomplished by navigating through the business object model and executing queries or actions. Unfortunately, the application developer has to do this testing manually. Moreover, such testing only focuses on the construction areas the developer is working on currently, and does not cover the validation of the contract and the constraints the service must fulfill.

Accordingly, there is a need to provide a conformance control module (CCM) for testing the conformance of a service at runtime and design time. The CCM may comprise service contract requirements that must be fulfilled by a service in order that it may be deemed conformant. The service contract requirements are predefined and vary based upon the functionality of the service being called. In addition, in order for a service to be deemed conformant there may be necessary constraints including states, phases, and conditions which are needed for each service call. Further, the service contract requirements may be separated by different interface methods that manage specific semantics, such as data access, transaction control, value sets, actions, etc.

The CCM may also log the complete service sequence, which contains all relevant information of the service to implement a conformance test. This logged information may be subsequently used to reproduce the conformance test. In addition, in the case of a runtime conformance test, it may be necessary for the application developer to be notified of the places of the non-conformance within the service.

SUMMARY

In accordance with principles of the present invention, as embodied and broadly described herein, methods, systems, and computer program products are provided for the testing of services through the utilization of a conformance control module.

According to one embodiment, a method is provided for performing a conformance test of a service. The method may comprise comparing meta-data returned by the service to predetermined parameters to determine whether the meta-data conforms to the predetermined parameters, determining a conformance violation exists when the comparing step indicates the meta-data does not conform to the predetermined parameters, determining a conformance violation does not exist when the comparing step indicates the meta-data does conform to the predetermined parameters, and continuing execution of the service based on the results of the determining steps.

In another aspect of the invention, computer-readable medium containing instructions to configure a processor to perform a method of performing a conformance test of a service is disclosed. The method may comprise comparing meta-data returned by the service to predetermined parameters to determine whether the meta-data conforms to the predetermined parameters, determining a conformance violation exists when the comparing step indicates the meta-data does not conform to the predetermined parameters, determining a conformance violation does not exist when the comparing step indicates the meta-data does conform to the predetermined parameters, and continuing execution of the service based on the results of the determining steps.

In another aspect of the invention, a conformance control module for performing a conformance test of a service is disclosed. The conformance control module may comprise a conformance control engine adapted to provide interfaces with the back-end components of a Service Oriented Architecture (SOA), a database storage device for logging conformance information and for non-conformance analysis by the service developer, and a conformance reporting engine adapted to provide interfaces for the analysis and presentation of the logged conformance information stored in the database storage device.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of implementations consistent with the present invention and, together with the description, help explain some of the principles associated with the invention. In the drawings.

DETAILED DESCRIPTION

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

Figure 1:
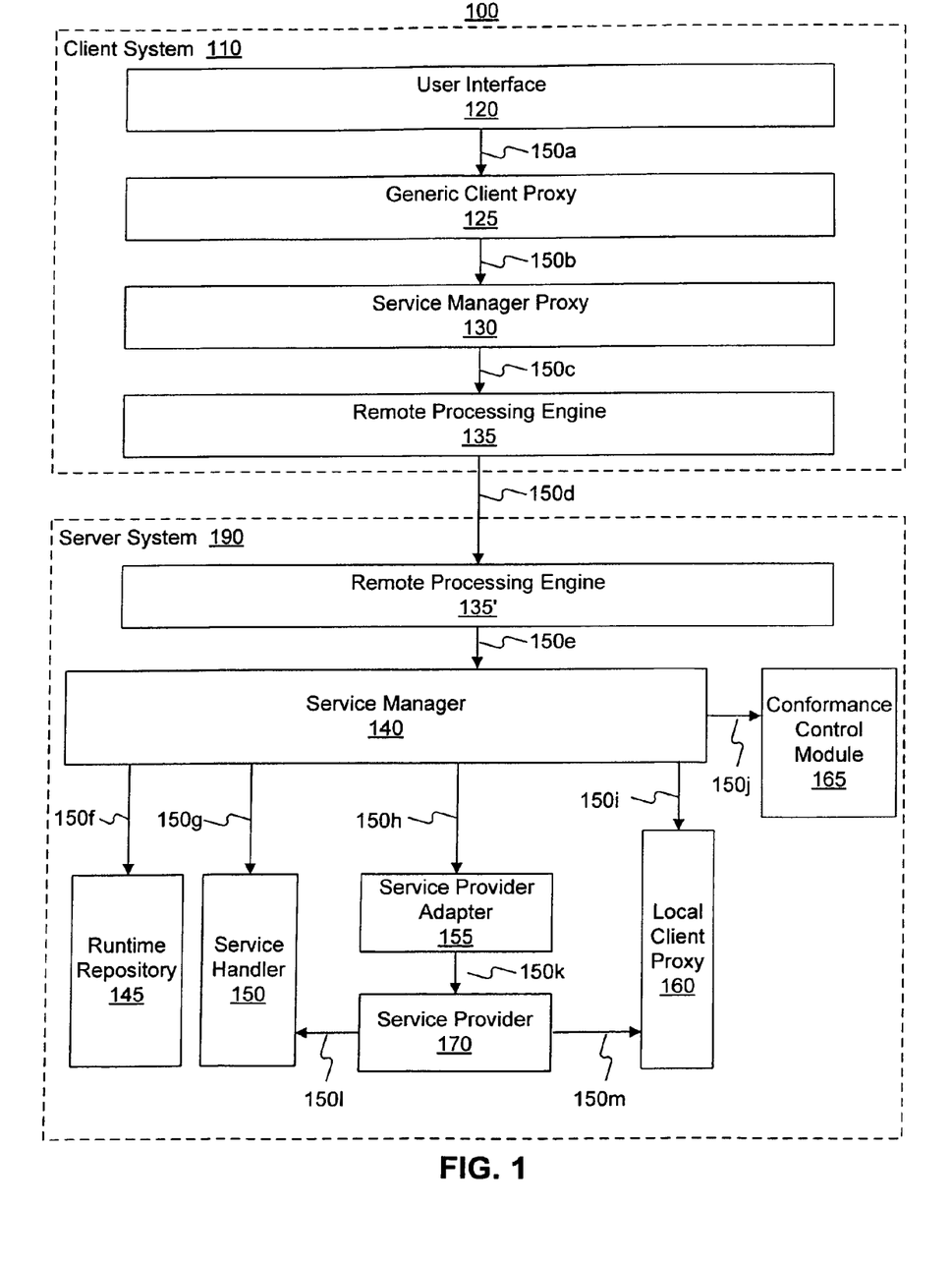
FIG. 1 illustrates a block diagram of an exemplary system architecture, consistent with certain aspects related to the present invention.

FIG. 1 illustrates a block diagram of an exemplary embodiment of a SOA enabled system 100. System 100 includes a front-end system depicted by client system 110, a back-end system depicted by server system 190, and a service provider 170. Client system 110 includes a user interface (UI) 120, a generic client proxy (GCP) 125, a service manager proxy 130, and a remote processing engine 135. Client system 110 connects to server system 190 through network connection 150d. Server system 190 includes a remote processing engine 135', a service manager 140, a runtime repository 145, a service handler 150, a service provider adapter 155, and a local client proxy 160. Server system 190 further includes a conformance control module (CCM) 165.

System 100 may be implemented as part of an SOA, which as discussed above, is a architectural framework that is designed to include and utilize one or more services, although any other architectural framework may be used. The services are accessible to other parts of the system 100, such as client systems 110 and their corresponding users by means of user interface 120 and through a communication mechanism such as the Internet or intranet. The services may be retrieved from an external third party service provider 170 or may be stored internally within the enterprise and retrieved using local client proxy 160. Service provider 170 may be implemented as a server or storage device used by a third party service developer to store and share its developed services with others. Service provider 170 may also be implemented as a central server or storage device used by multiple service developers to store and register their services. It should be noted that although FIG. 1 shows a single client system 110 and a single server system 190, a plurality of client systems and server system may be used. Moreover, the components depicted in FIG. 1 may be distributed among multiple locations.

Client system 110 may include one or more processors, such as computers, to interface with server system 190. User interface 120 may provide an interface to allow a user to interact with other applications and business objects. For example, user interface 120 may be a software application, such as a browser. In some implementations, SAP Web Dynpro (commercially available from SAP AG, Walidorf, Germany) is used as a model-based development environment for generating user interface 120, although other development environments may also be used. User interface 120 may call a Application Programming Interface (API) of a proxy, such as generic client proxy 125 through network connection 150a to, for example, interact with available services via the service manager proxy 130 and the remote processing engine 135.

Network connections 150a-150m may include, alone or in any suitable combination, a telephony-based network, a local area network (LAN), a wide area network (WAN), a dedicated intranet, wireless LAN, the Internet, and intranet, a wireless network, a bus, or any other communication mechanisms. Further, any suitable combination of wired and/or wireless components and systems may provide network connections 150a-150m. Moreover, network connections 150a-150m may be embodied using bi-directional, unidirectional, or dedicated communication links. Network connections 150a-150m may also implement standard transmission protocols, such as Transmission Control Protocol/Internet Protocol (TCP/IP), Hyper Text Transfer Protocol (HTTP), SOAP, Remote Procedure Call (RPC), or other protocols.

Generic client proxy 125 and service manger proxy 130 are proxies that provide a predefined interface that may be called by user interface 120 at client system 110. Remote processing engine 135 manages an interface that allows user interface 120 to use a service operating on a remote machine, such as server system 190. In some implementations, a service manager proxy 130 may be used along with the remote processing engine 135 to provide a buffer to the user interface 120 and the service manager 140. When instantiated, generic client proxy 125 may provide an interface, such as a RPC or SOAP interface, managed by the remote processing engine 135, to another remote processing engine 135' residing on the server system 190. Remote processing engine 135 and remote processing engine 135' may be used to manage the communications between client system 110 and server system 190 by providing functionality for receiving messages (e.g., a request for a service) from client system 110, processing the messages on server system 190, and returning the results. For example, if the message from client system 110 includes a request for a service, remote processing engine 135' will invoke service manager 140. The service manager 140 provides the interface between the remote processing engine 135' and the service provider 170. When the service manager 140 receives a service request from remote processing engine 135', the service manager 140 may call a procedure through an API to instantiate one or more of the one or more services provided by service provider 170, or another business unit within the enterprise via local client proxy 160. Results of the service request are returned to remote processing engine 135', which in turn returns the results to client system 110 via remote processing engine 135.

Service manager 140 may connect to runtime repository 145, which stores objects, such as business objects, including data and meta-data for the business objects that may be acted upon or manipulated by a called service. Meta-data may be defined as data about data, and are used as the building blocks for business objects. For example, meta-data may refer to information about the data itself, such as content, quality, condition, origin, size, formatting, characteristics of data, and the like. Runtime repository 145 may be any one of a number of commercially available repositories and may employ any of a number of commercially available databases systems, such as Microsoft Access, dbase, Oracle, Sybase, etc. For example, repository 145 may store a list of business object nodes including an identifier (ID) and data content.

As noted above, a business object is a contained collection of data, business operations and rules. On the other hand, a business object node refers to a portion of a business object. Thus, if a purchase order is used as an example of a business object, then the header of the purchase order may be considered the business object node. Further, the ID of a business object refers to an identifying memory address of a business object node that uniquely identifies individual business object nodes within repository 145. The memory address may be used to access and read data content of a particular business object node. For example, an ID of a business object node may consist of a directory structure and filename associated with the business object node. In general, a business object may contain many business object nodes. These business object nodes may form a so-called "tree" structure defined by parent-child business object node associations. The root node of a business object refers to the business object node that may not have any parent node, but may have children nodes. All other nodes of a business object may form a tree of business object nodes with the root node as the root of the tree. A business object root node may contain key information of its associated business objects, such as the identification of the business objects, the names of the business objects, and the like. A business object may also contain queries that may return elements of its root node, and queries that may use the retrieved root node information to access other associated business object nodes.

The description of a service may be accomplished through the use of programming languages, such as WSDL or ESDL. In particular ESDL allows the descriptions of services that interact with business objects. For example, the service, when called, may instantiate one or more business objects. The term "instantiate" means, in an object-oriented programming environment, deploying, customizing, running, and/or executing an application on an object of a particular class. The service and corresponding business objects may be called using a message formatted based on ESDL or WSDL. The call including the ESDL or WSDL formatted message, may form the basis of the service contract by defining the interaction between a client system 110, the service, and corresponding business objects, along with properties of the business objects (and nodes). That is, the service contract provides the definition of the formats and/or protocols needed to interact with a service and a business object instantiated by the service. The testing of the conformance of a service against the predefined requirements set forth in its corresponding service contract may be accomplished by CCM 165.

The CCM 165, which resides on server system 190, is separated from the runtime environment of client 110. The appropriate interfaces for controlling the CCM 165 and feedback notifications are provided by the SOA enabled system 100 through network connections 150d. Moreover, the complete runtime of the CCM 165 is integrated into the backend (i.e., server system 190) of the SOA enabled system 100. In particular, the CCM 165 is realized as a plug-in with the SOA enabled system 100 with "hooks" located before and after each service call by the service manager 140. As used herein, the term "hooks" refers to placeholders for callback functions that instantiate CCM 165. Further, as used herein, a "callback function" refers to executable code that calls a function or executable code of another application.

As illustrated in FIG. 1, the CCM 165 interfaces with the service manager 140. For each service manager interface method between the local client proxy interface method, handler interface method, and service provider interface method, depending on the service provider adapter 155 used (i.e., the service called), the CCM 165 provides conformance testing of the called service.

Figure 2A:
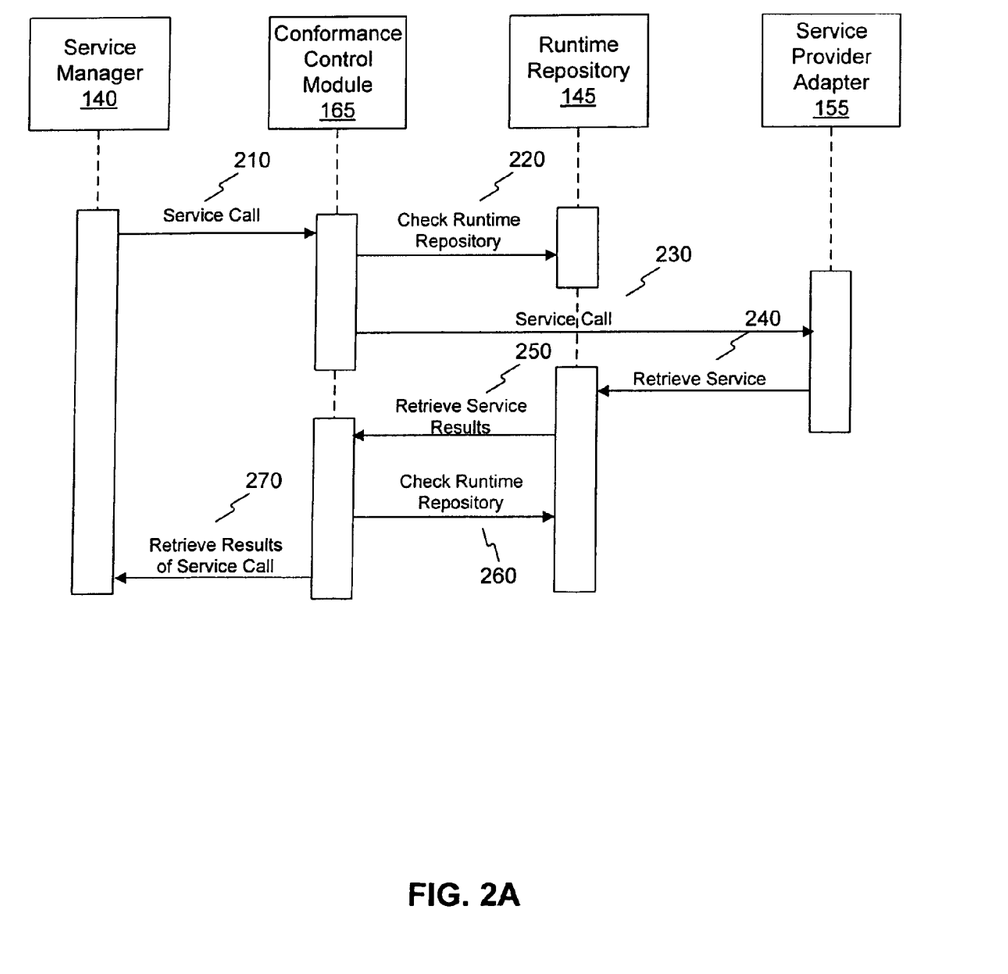
FIGS. 2A-2C illustrate sequence diagrams of an exemplary operation of the conformance control model, consistent with certain aspects related to the present invention.
Figure 2B:
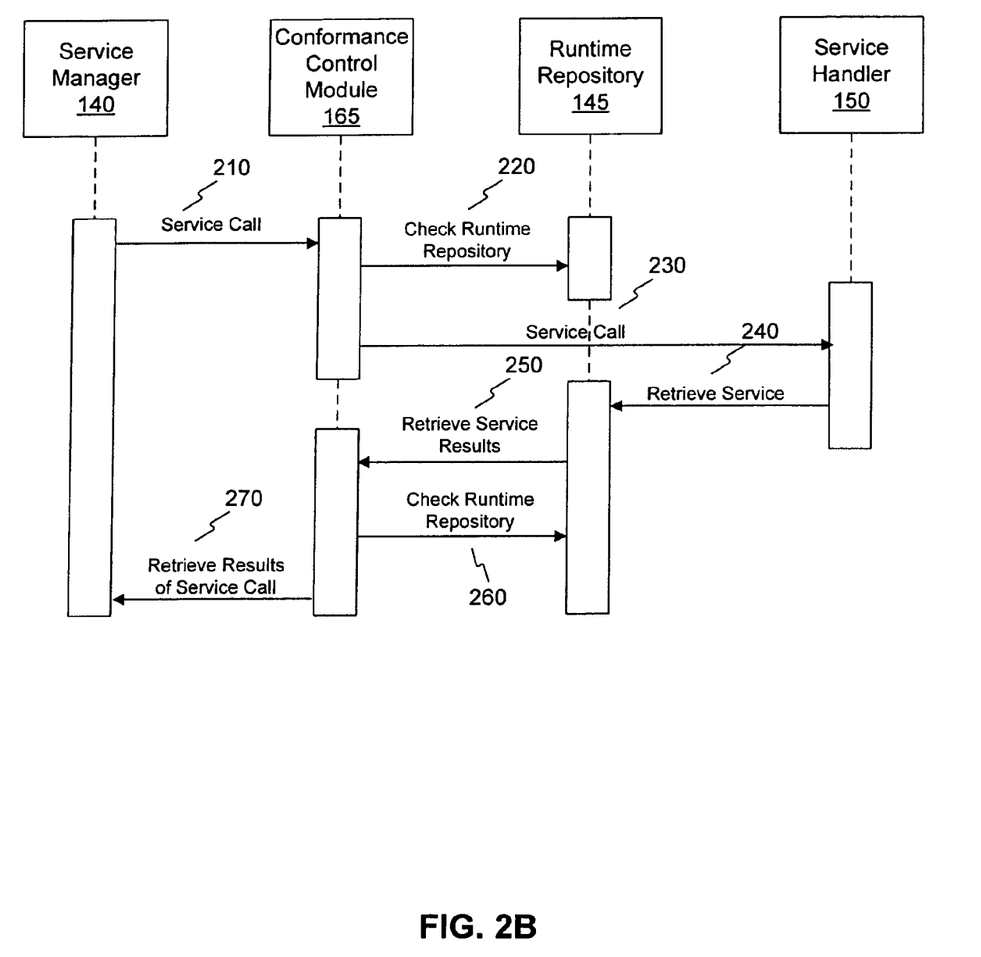
Figure 2C:
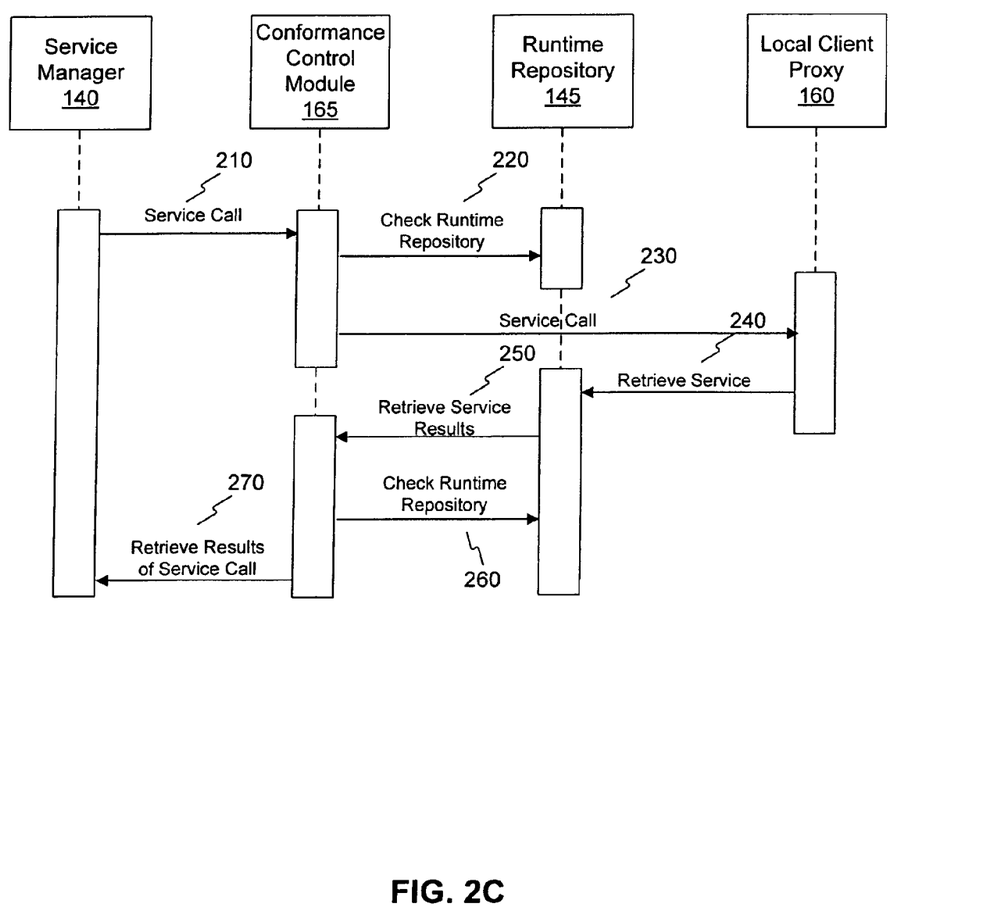

FIGS. 2A-2C illustrate sequence diagrams of exemplary callback functions in relation to service calls of service manager 140. The conformance test may be performed by instantiating the CCM 165 prior to the service being called and after the results of the service are returned. As illustrated, for each service call (step 210) of the service manager 140 to the service provider adapter 155 (FIG. 2A), service handler 150 (FIG. 2B), or local client proxy 160 (FIG. 2C) the CCM 165 is instantiated prior to the service being called (step 230). Prior to the service being called (step 230), the instantiated CCM 165 may check the content and/or form of data and meta-data stored within runtime repository 145 (step 220). After the check of muntime repository 145 (step 220) the CCM 165 allows the service to be called (step 230). Subsequently, the service is retrieved (step 240), the interaction with runtime repository 145 is performed, and the results of the service are returned (step 250). However, before the results are returned to the service manager 140 (step 270), the CCM 165 is once again instantiated. The CCM 165 may once again check the content and/or form of data and meta-data stored within runtime repository 145 (step 260). The check of the runtime repository 145 performed in step 260 may be compared to the results of the check of the runtime repository 145 performed in step 220 to test the conformance of the called service. Moreover, the conformance test may be performed with the same signature as the original interface method. In other words, the conformance test may return the same interface method name, the number, type of the interface method parameters, and the return type of the originally called interface method. If the service is found to be in conformance by CCM 165, the results of the service call are returned to service manager 140 (step 270). If the service is found to be in non-conformance, additional information, such as a flag describing whether the CCM 165 should abort operation of the service or only log information, may also be part of the signature, as well as being provided to the user interface 120. Further, the CCM instance 165 itself may be managed as a so-called "singleton" (i.e., limiting the CCM 165 to one only instance) within one application context, which may provide a more efficient operation of CCM 165.

The specific operation of the conformance testing performed by the CCM 165 may depend on the service being called. In the particular case of a service call to service provider 170, as illustrated in the exemplary sequence diagram FIG. 2A, the conformance testing performed by the CCM 165 may depend on the interfaces that the service provider adapter 155 provide for each service provider 170. The service provider adapter 155 serves as an interface between the service manager 140 and the service provider 170, and thus allows the service manager to invoke the services provided by the service provider 170. The interface is specific to each called service and contains the data that describes the service contract and requirements for that service. Thus, based upon the signature of the called service and the interface, the CCM 165 recognizes the service being called and performs testing in accordance with the called service and its corresponding service contract. Additional service contracts may be introduced and/or modified by a particular service provider adapter 155 utilized by a service provider 170. For example, the service contract may be modified to add or delete requirements that are necessary for a service to be designated as conformant. In order to also support these different types of adapters within the CCM 165, interfaces are implemented by the service provider adapter 155 which provide notifications and logging services.

Service handler 150 is comprised of software routines that may process, for example, a service's request for messaging, dynamic properties change notifications (e.g., making data associated with a business object read-only, changeable, mandatory, invisible, and the like), transactions, locking, repository access, context management, and the like. A service contract of a service may, for example, set forth that necessary constraints including states, phases, and conditions of the runtime repository 145 that may be needed for each service call. Therefore, for each interface method of the service handler 150, the CCM 165 provides conformance testing to ensure that the runtime repository is in the proper state and/or phase as is set forth in the service contract. These interfaces methods may be called within the service handler implementations, as illustrated in the exemplary sequence diagram FIG. 2B.

Although most conformance tests will be processed because of interface methods with the service provider adapter 155 and the service handler 150, a requirement may be added that only business objects of the same business unit may be accessed via the local client proxy 160. In particular, this requirement may necessitate that the local client proxy 160 functions with the CCM 165, as illustrated in the exemplary sequence diagram FIG. 2C. To prepare for additional requirements, the CCM 165 provides appropriate conformance testing for each interface method of the local client proxy 160. These interface methods are called within implementations of the local client proxy.

Figure 3:
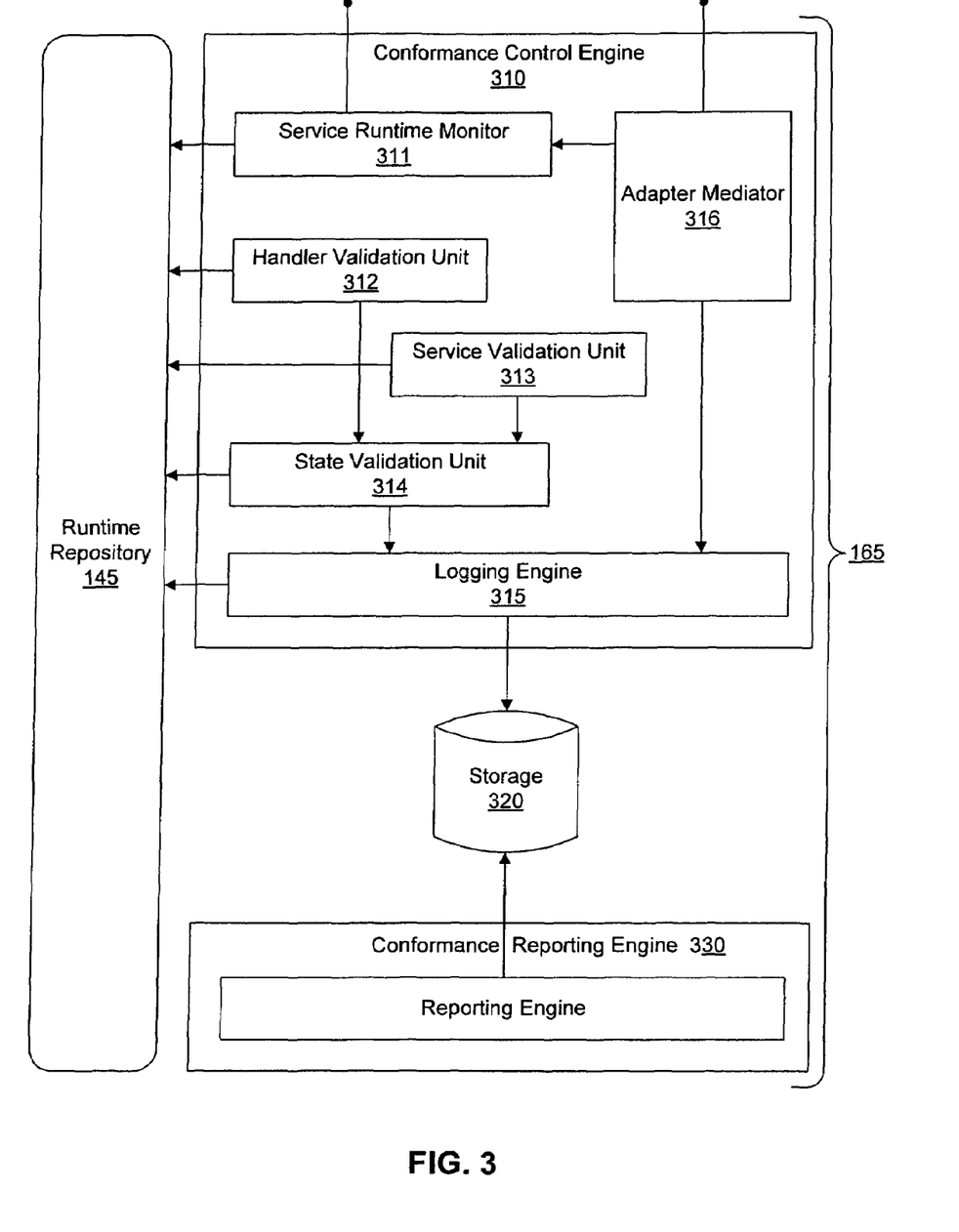
FIG. 3 illustrates a bock diagram of exemplary elements of the conformance control module and their interaction with other elements of an exemplary system architecture, consistent with certain aspects related to the present invention.

FIG. 3 illustrates a more detailed embodiment of the CCM 165. As illustrated, the CCM 165 may be separated into a conformance control engine 310, database storage device 320, and conformance reporting engine 330. The conformance control engine 310 comprises the runtime part of the CCM 165, which manages the conformance testing of a called service by providing interfaces for the service manager 140, the service handler 150, the service provider adapter 155, and the local client proxy 160. The conformance control engine 310 may be implemented as a software component that may be used in the SOA at runtime (e.g., as a "plug-in"). The conformance reporting engine 330 provides interfaces for the analysis and presentation of the logged conformance testing data stored in database storage device 320.

The conformance control engine 310 comprises a service runtime monitor 311, several validation units 312-314, a logging engine 315, and an adapter mediator 316. The service runtime monitor 311 provides an interface, which may be called by the service manager 140 or the service provider adapter 155. Within the conformance control engine 310, the service runtime monitor 311 may log the call to service provider 170 and manage the duration and instances of the adapter mediator 316.

Because the service provider adapter 155 may implement sophisticated behavior and therefore may introduce complete new service provider interfaces, the adapter may require well-defined interfaces to ensure the conformance of the service provider 170. The adapter mediator 316 represents a bridge between the service provider adapter 155 and the conformance control engine 310. Hence, the adapter mediator 316 provides the connections and notification interfaces for the service provider adapter 155.

In addition, the other components of the conformance control engine 310, such as the handler validation unit 312, tests the correct handler usage within service calls. The service validation unit 313 observes the conformance of a single service by comparing conditions prior to the service being called and after the service is called. Conditions that are compared may include the content and/or form of data and meta-data stored within runtime repository 145. The state validation unit 314 inspects the overall service contract conformance of the service provider 170. The logging engine 315 provides the interfaces for accessing the content of the database storage device 320 and the abstraction of the underlying database schema.

Through the utilization of the components of the conformance control engine 310, the CCM 165 is capable of performing a variety of conformance tests of called services based upon their service contracts. For example, the CCM 165 may test a service based on the data or meta-data it returns or modifies in runtime repository 145. In particular, the data may be in the form of a business object as discussed above. The CCM 165 may also test a service based upon the sequence of functionalities called within a service or by multiple services. For example, a service may provide a retrieve functionality and another service may provide a retrieve by association functionality. The retrieve service performs the functionality of retrieving a designated business object from runtime repository 145. The retrieve by association service performs the functionality of identifying a parent identifier of a business object node and retrieving the corresponding children nodes. A service contract may set forth that the retrieve service be called prior to the retrieve by association service. The CCM 165 is therefore capable of tracking the sequence of services called in order to perform this conformance test. In addition, the CCM 165 is capable of performing conformance testing of a service based on the state of the runtime repository 165. The service contract may describe a state model, which may be used to control access to business objects and determine when a requesting service may read or write a business object's data without conflicting or interfering with the access of other services to the same data. For example, if a service tries to modify a business object, the modification may be prevented if another service is already in the process of modifying the same business object. The CCM 165 may perform this conformance testing of the service by monitoring the state of the runtime repository 145 when the service is called and during implementation of the service.

Database storage device 320 stores conformance information used for non-conformance analysis by the service provider developers. In general, non-conformant behavior may result in a termination of the service, but in special circumstances the non-conformance may be so insignificant that it is not appropriate to cancel further processing. The threshold of non-conformance severity that will result in termination of the of the service may be included as part of the coding for the conformance test performed. For example, a called service may include a parameterized query function with one parameter of the query being that the data returned from the query will be in a sorted format: However, if the data returned is instead returned in an unsorted format, the test may be coded to provide that such a non-conformance should not result in a termination of the service. In either case, information regarding conformance (or non-conformance) may be logged within database storage device 320. This information may be viewed with a browser and/or analyzed with some form of tool support (i.e., software capable of modeling or simulating a process) by the application developer later for diagnostic purposes and/or to inform the responsible service provider about non-conformance. An example of tool support is NetWeaver Developer Studio developed by SAP AG.

Figure 4:
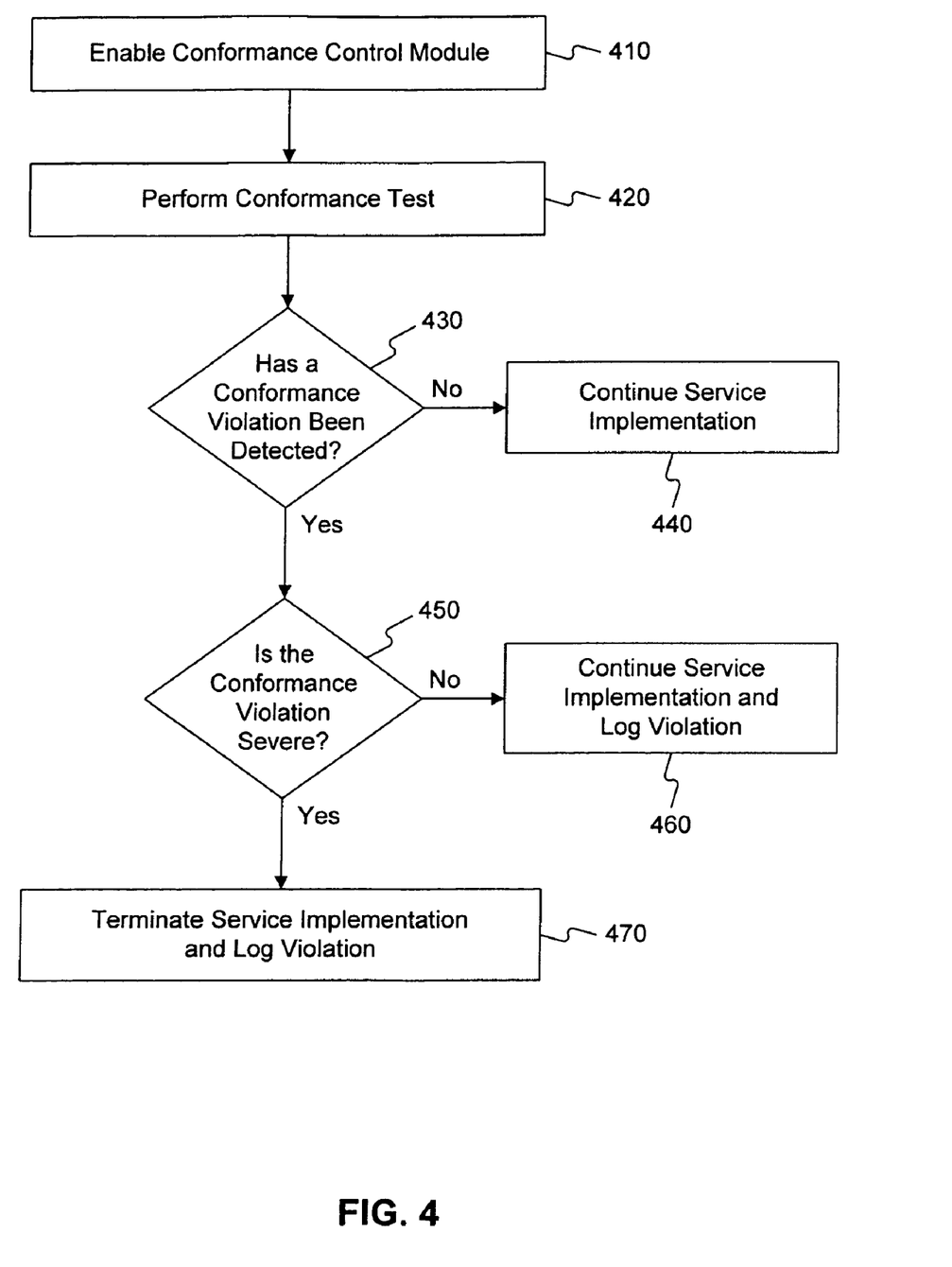
FIG. 4 depicts a flowchart of exemplary steps, consistent with certain aspects related to the present invention.

FIG. 4 illustrates a flowchart of exemplary steps associated with the conformance test performed by the CCM 165. Initially, in step 410, the CCM 165 may be enabled or disabled by the user interface 120 at runtime. For this purpose, the CCM 165 provides enabling methods through user interface 120 that may allow a user to enable or disable the CCM 165 at runtime. The enabling method may, for example, be in the form of a graphical user interface (GUI) object, such as a button, drop-down menu, dialog box, or the like. The GUI object may be mapped to a logic expression, such as "Enable (boolean enable=true)" or any other equivalent expression that would be known by one of ordinary skill in the art.

In step 420, for each interface method (e.g., through an API) between the service manager 140 and the service provider adapter 155, and for each interface method with the service handler 150, the CCM 165 performs a conformance test. Further, as previously noted, the CCM 165 may also perform a conformance test for each interface method with the local client proxy 160 when business objects or services from a different business unit is attempted to be accessed. As discussed above, the CCM 165 may perform the conformance test of the called service based on comparison of the data, meta-data, and/or identifier that the service returns or modifies, with the requirements set forth in the service contract. A determination of the data, meta-data, and/or identifier that the service returns or modifies may be made by checking the content and/or form of data and meta-data stored within runtime repository 145 prior to the service being called, during the service call, and after the service is called. The CCM 165 may also perform the conformance test based on a comparison of the sequence of the service call or the state of the runtime repository 145 with the service contract requirements.

In step 430, a determination is made as to whether the conformance test has detected a conformance violation. As outlined below, the actual conformance violation will depend on the specific requirements outlined in the service contract for the corresponding service. For example, a specific contract requirement may specify that a service will not import a business object node ID without the existence of a corresponding exporting business object node root ID. In this example, the CCM 165 will perform a pre-method test (i.e., prior to the service being called) of runtime repository 145 to ensure that each node ID within runtime repository 145 correlates to an exporting root ID (a business object node root ID is an identifier for a node (portion) of a business object). The CCM 165 may also perform a post-method test (i.e., subsequent to the service being called) to ensure, for example, that for any business object node root IDs imported by the service, a corresponding exporting business node root ID also exists. If this is not the case, the CCM may determine that there is a conformance violation. In this instance, the pre-method test and the post method test are performed by the CCM 165 by comparing the meta-data stored in runtime repository 145 at different time intervals in conjunction with the requirements of the service contract. If a conformance violation has not been detected, the service is allowed to be implemented (step 440). However, if a conformance violation has been detected, a determination may be made as to the severity of the conformance violation (step 450). If the conformance violation is deemed not to be severe, the service operation may be allowed to continue and the violation is logged within database storage device 320 (step 460). Severe conformance violations may result in the immediate termination of the service and the logging of the violation within database storage device 320 (step 470).

The conformance tests performed in step 420 by CCM 165 will necessarily depend on a variety of factors, such as the contract requirement for the corresponding service being called, or the general required performance of the service. Further, the testing may be done on a service level, a contract conformance level, or a business object level. By way of example, below are a couple of the different levels of testing and the types of conformance testing that may be performed by the CCM 165 as part of step 420.

An example of a service is labeled as "Keys and Root identifiers." The functionality performed by this service relates to the importing of a business object node IDs. An exemplary contract requirement for this service may set forth that for each importing business object node ID, an exporting business object node root ID also exists. When this service is called, the CCM 165 tests to ensure that for each importing business object node ID, an exporting business object node root ID also exists. If a corresponding business object node root ID is missing, the CCM 165 logs this service as non-conformant and stores an indication of non-conformance in database storage device 320.

Another example of a service is labeled as "Query." The functionality performed by this service relates to performing searches of business objects located in runtime repository 145. An exemplary contract requirement for this service may set forth that an implementation of this service should not raise any change notifications (e.g., a change to the contents of a business object stored in runtime repository 145) or dynamic properties due to the state model constraints. The CCM 165 may monitor change notifications and dynamic properties in the scope of the query service implementation, log them as non-conformant, and store an indication of non-conformance in database storage device 320.

Moreover, although the above describes specific services and specific conformance tests performed on these services by CCM 165, CCM 165 may also perform other conformance control tests on other services as depicted in Table 1.

TABLE 1

| Test Category | Service | Test Description |
|---|---|---|
| ServiceValidation | RetreiveRootNodeIDs | For each importing node ID an exporting root ID must exists. If a corresponding root ID is missing the CCM should log this as a non-conformant retrieve-root-ids implementation. |
| ServiceValidation | Query | The CCM should check whether the fill data option is implemented by the service provider correctly. In the case of no fill data, only the table of keys should be filled. If the data table is also filled, this can be ignored. On the other hand in the case of fill data the data table has to be filled correctly. |
| StateValidation | Query | The query service implementation should not raise any change notification due to the state model constraints. The CCM should monitor change notifications in the scope of the query service provider implementation and log them as non-conformant. |
| StateValidation | Query | The query service implementation should not raise any dynamic properties due to the state model constraints. The CCM should monitor dynamic properties in the scope of the query service provider implementation and log them as non-conformant. |
| ServiceValidation | Query | Dependent object nodes and child nodes should necessarily have the PARENT_NODE_ID field filled during a Query when data is requested (IN_FILL_DATA = 'X'). |
| ServiceValidation | Retrieve | The sum of failed keys (OUT_FAILED_NODE_IDS) and the out data records (OUT_DATA) should be equal to the number of in keys (IN_NODE_IDS). |
| ServiceValidation | Retrieve | Dependent object nodes and child nodes should necessarily have the PARENT_NODE_ID field filled during a Retreive. |
| ClientValidation | Modify | The source BO node name (SOURCE_BO_NODE_NAME), the source node id (SOURCE_NODE_ID) and the traversed association name (ASSOCIATION_NAME) should be provided as blank in the modification structure (IN_MODIFICATION), in the CREATE operation. |
| ClientValidation | Modify | During the create call, the temporary key handle (NODE_ID) of the modification structure (IN_MODIFICATIONS) should not be blank. |
| ClientValidation | Modify | The list of attributes that are changed (CHANGED_ATTRIBUTES) in the modification structure (IN_MODIFICATIONS) should only contain those attributes that are actually part of the node name specified (BO_NODE_NAME). |
| HandlerValidation | Modify | The client proxies supplies temporary node IDs for the create service at runtime which can be changed by the service provider. Such a node ID changing should be notified at runtime via a change notification. |
| ServiceValidation | RetrieveByAssociation | Dependent object nodes and child nodes should necessarily have the PARENT_NODE_ID field filled during a RETRIEVE_BY_ASSOCIATION, when data is requested (IN_FILL_DATA = 'X'). |
| ServiceValidation | RetrieveByAssociation | The records table (OUT_DATA) should be filled if data is not requested (IN_FILL_DATA = ' '). |
| ServiceValidation | RetrieveByAssociation | The number of data records returned (OUT_DATA) should be equal to number of distinct target node ids (OUT_LINKS-TARGET_NODE_ID) in the source-target links table (OUT_LINKS). |
| ServiceValidation | Query | In case filter keys (IN_FILTER_NODE_IDS) are passed, Query should return only those NodeIDs/records which for a subset of the filter keys. |
| ServiceValidation | Query | The CCM should check whether the selection options are implemented by the service provider correctly. In particular the different types of selection options like equal, less than, contains pattern, and so on must be implemented correctly. |
| ServiceValidation | Query | In case the maximum rows (IN_QUERY_OPTIONS-MAXIMU_ROWS) parameter is supplied, Query should limit the number of records/NodeIDs fetched, to the maximum rows. |
| ServiceValidation | Retrieve | Both, the out records (OUT_DATA) returned and the failed keys (OUT_FAILED_NODE_IDS) returned, should contain only those NodeIDs that have been requested (IN_NODE_IDS). |
| ServiceValidation | Modify | Before modifying any BO node elements the records should be switched in the appropiate edit mode by the service consumer. It is not allowed to change any data in the node elements if the |

TABLE 1-continued

| Test Category | Service | Test Description |
|---|---|---|
| | | mode is not 'edit' or 'edit exclusive'. The CCM may detect such an incompliant service consumer implementation at runtime by monitoring the edit modes of each BO node element sent to the consumer. If the CCM detects such an incompliant behavior of a service consumer the CCM should log this as a non-conformant service provider implementation. |
| ServiceValidation | Modify | The deletion of a parent node element must result in the deletion of all children associated to the parent via the parent-child-composition. |
| ServiceValidation | Query | The CCM should check whether the query options are implemented by the service provider correctly. In particular the sorting and the paging options must be implemented correctly. |
| ServiceValidation | Query | A Boolean field can only have the following values 'X', ' ', 'True' or 'False'. Any other value is illegal. |
| ServiceValidation | Query | In case the node has a XSD: DATETIME field, the value should be compliant with UTC guidelines. If the field is defined as STRING, the possible values could be found at http://www.w3.org/TR/NOTE-datetime. If the field is of type XSDDATETIME_Z or XSDDATETIME_LONG_Z then it should follow the format prescribed for these data elements (UTC long decimal YYYYMMDDhhmmss, mmmuuun) |
| ServiceValidation | Query | In case the node has a XSD: LANGUAGE field, the value should be correspond to the ISO codes if the field length is 2 (CHAR(2)) or language key as defined in the table T002 when the field length is 1 (XSDLANGUAGE). |
| ServiceValidation | Query | In case the node has a XSD: DATE field, the value should be in the YYYYMMDD format. |
| ServiceValidation | Query | In case the node has a XSD: TIME field, the value should be in the HHMMSS format. |
| ServiceValidation | Retrieve | The keys in out_data and out_failed_node_ids must correspond to the data records. It is not allowed to return data for keys which are not requested. |
| ServiceValidation | Retrieve | In case the node has a XSD: BOOLEAN field, the value of the field can only be ' ' (single blank) or 'X'. |
| ServiceValidation | Retrieve | In case the node has a XSD: DATETIME field, the value should be compliant with UTC guidelines. If the field is defined as STRING, the possible values could be found at http://www.w3.org/TR/NOTE-datetime. If the field is of type XSDDATETIME_Z or XSDDATETIME_LONG_Z then it should follow the format prescribed for these data elements (UTC long decimal YYYYMMDDhhmmss, mmmuuun) |
| ServiceValidation | Retrieve | In case the node has a XSD: LANGUAGE field, the value should be correspond to the ISO codes if the field length is 2 (CHAR(2)) or language key as defined in the table T002 when the field length is 1 (XSDLANGUAGE). |
| ServiceValidation | Retrieve | In case the node has a XSD: DATE field, the value should be in the YYYYMMDD format. |
| ServiceValidation | Retrieve | In case the node has a XSD: TIME field, the value should be in the HHMMSS format. |
| HandlerValidation | Modify | The create service implementation of a service provider can change the value of the supplied attributes at runtime. Such an attribute changing must be notified at runtime via an attribute change notification which is part of the signature of the modify service currently. The CCM can check this by re-reading the just created node element and comparing the supplied attribute values against the retrieved attributes. These values must be the same except for the attributes for which change notifications are available. |
| HandlerValidation | Modify | If the modify service implementation does not accept the data modifications, it should notify the consumer via messages. By re-reading the data such situations can be detected. |
| ServiceValidation | RetrieveByAssociation | An association should not return more records than that defined by the cardinality constraints designed in the runtime repository. |
| ServiceValidation | RetrieveByAssociation | The source-target links table (OUT_LINKS) should contain those source node ids (OUT_LINKS-SOURCE_NODE_ID) those were requested (IN_NODE_IDS). |
| ServiceValidation | RetrieveByAssociation | In case the node has a XSDBOOLEAN field, the value of the field can only be ' ' (single blank) or 'X'. Valid for IN_FILL_DATA = 'X' |
| ServiceValidation | RetrieveByAssociation | In case the node has a XSD: DATETIME field, the value should be compliant with UTC guidelines. If the field is defined as STRING, the possible values could be found at http://www.w3.org/TR/NOTE-datetime. If the field is of type XSDDATETIME_Z or XSDDATETIME_LONG_Z then it should follow the format prescribed for these data elements (UTC long decimal YYYYMMDDhhmmss, mmmuuun) |
| ServiceValidation | RetrieveByAssociation | In case the node has a XSD: LANGUAGE field, the value should be correspond to the ISO codes if the field length is 2 (CHAR(2)) |

TABLE 1-continued

| Test Category | Service | Test Description |
| --- | --- | --- |
| | | or language key as defined in the table T002 when the field length is 1 (XSDLANGUAGE). |
| ServiceValidation | RetrieveByAssociation | In case the node has a XSD: DATE field, the value should be in the YYYYMMDD format. |
| ServiceValidation | RetrieveByAssociation | In case the node has a XSD: TIME field, the value should be in the HHMMSS format. |
| ServiceValidation | ExecuteAction | Based on the cardinality of the action, the appropriate number of NodeIDs should be passed for a given Action. 0 rows for "No rows of input", 1 row for "One row as input", 2 rows for "Two rows as input" and at least 1 row for "Multiple rows for input" cardinality. |

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the level of conformance testing that may be performed by the CCM 165 may be expanded upon to include not only more conformance tests within a particular service, but also conformance tests on services not listed herein.

Further, the described implementations include software, but systems and methods consistent with the present invention may be implemented as a combination of hardware and software or in hardware alone. Examples of hardware include computing or processing systems, including personal computers, servers, laptops, mainframes, micro-processors and the like. Additionally, although aspects of the invention are described as being stored in memory, one skilled in the art will appreciate that these aspects may also be stored on other types of computer-readable media, such as secondary storage devices, for example, hard disks, floppy disks, or CD-ROM, the Internet or other propagation medium, or other forms of RAM or ROM.

Computer programs based on the written description and methods of this invention are within the skill of an experienced developer. The various programs or program modules may be created using any of the techniques known to one skilled in the art or can be designed in or by means of Java, C++, HTML, XML, or HTML with included Java applets or in SAP R/3 or ABAP. One or more of such software sections or modules may be integrated into a computer system or existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosures. The limitations in the claims are to be interpreted broadly based on the language employed in the claims and not limited to examples described in the present specification or during the prosecution of the application. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A method, comprising:
   comparing meta-data returned by the service to predetermined parameters to determine whether the meta-data conforms to the predetermined parameters;
   determining that a conformance violation exists when the comparing indicates that the meta-data does not conform to the predetermined parameters;
   determining, based on the determined conformance violation, a severity of the conformance violation;
   determining that the conformance violation does not exist when the comparing indicates that the meta-data conforms to the predetermined parameters; and
   continuing execution of the service based on the determination that the conformance violation exists and the severity of the conformance violation.

2. The method claim 1, further comprising:
   continuing execution of the service when the conformance violation does not exist.

3. The method claim 1, further comprising:
   analyzing the conformance violation to determine the severity; and
   aborting the continuing execution of the service based on the determined severity of the conformance violation.

4. The method of claim 1, wherein the comparing further comprises:
   comparing the meta-data stored within a runtime repository prior to the implementation of the service and after the implementation of the service.

5. The method claim 1, further comprising logging the conformance violation in a storage device.

6. The method of claim 1, wherein the predetermined parameters are defined in a service contract.

7. The method of claim 1, wherein the predetermined parameters comprise;
   a requirement that for each business node imported by the service a corresponding exporting business node root identifier also exists.

8. The method of claim 1, wherein the predetermined parameters comprise:
   a requirement that the service may not edit a business object unless the service consumer has indicated that editing a business object is allowed.

9. The method claim 1, wherein the service is a service that is accessible via the Internet or an intranet.

10. A non-transitory computer-readable medium containing instructions to configure a processor to perform operations comprising;
    comparing meta-data returned by the service to predetermined parameters to determine whether the meta-data conforms to the predetermined parameters;

determining that a conformance violation exists when the comparing indicates that the meta-data does not conform to the predetermined parameters;

determining, based on the determined conformance violation, a severity of the conformance violation;

determining that the conformance violation does not exist when the comparing indicates that the meta-data conforms to the predetermined parameters; and continuing execution of the service based on the determination that the conformance violation exists and the severity of the conformance violation.

11. The computer-readable medium of claim 10, wherein the operations further comprise:

continuing execution of the service when the conformance violation does not exist.

12. The computer-readable medium of claim 10, wherein the operations further comprise:

analyzing the conformance violation to determine severity; and aborting the continuing execution of the service based on the severity of the conformance violation.

13. The computer-readable medium of claim 10, wherein the comparing further comprises:

comparing the meta-data stored within a runtime repository prior to the implementation of the service and after the implementation of the service.

14. The computer-readable medium of claim 10, wherein the operations further comprise:

logging the conformance violation in a storage device.

15. The computer-readable medium of claim 10, wherein the predetermined parameters are defined in a service contract.

16. The computer-readable medium of claim 10, wherein the predetermined parameters comprise:

a requirement that the service may not edit a business object unless the service consumer has indicated that editing a business object is allowed.

17. The computer-readable medium of claim 10, wherein the comparing further comprises:

comparing the meta-data stored within a runtime repository prior to the implementation of the service and after the implementation of the service.

18. The conformance control module of claim 17, wherein the interfaces are provided for a service manager, a service handler, and a service provider adapter.

19. The conformance control module of claim 18, wherein an interface is provided for a local client proxy.

20. A conformance control module for performing a conformance test of a service, comprising:

a conformance control engine adapted to provide interfaces with the back-end components of a service oriented architecture;

wherein the conformance control engine is configured to
compare meta-data returned by the service to predetermined parameters to determine whether the meta-data conforms to the predetermined parameters, determine that a conformance violation exists when the comparing indicates that the meta-data does not conform to the predetermined parameters;

determine, based on the determined conformance violation, a severity of the conformance violation;

determine that the conformance violation does not exist when the comparing indicates that the meta-data conforms to the predetermined parameters; and continue execution of the service based on the determination that the conformance violation exists and the severity of the conformance violation;

a database storage device for logging conformance information and for non-conformance analysis by a service developer; and a conformance reporting engine adapted to provide interfaces for the analysis and presentation of the logged conformance information stored in the database storage device.

* * * * *